United States Patent
Gong (10) Patent No.: US 12,279,601 B2
(45) Date of Patent: Apr. 22, 2025

(54) PET WATER-FEEDING BOWL

(71) Applicant: Xiaoyi Intelligent Technology Yangzhou Co., Ltd, Yangzhou (CN)

(72) Inventor: Yuan Gong, Jiangsu (CN)

(73) Assignee: Xiaoyi Intelligent Technology Yangzhou Co., Ltd, Yangzhou (CN)

( * ) Notice: Subject to any disclaimer, the term of this patent is extended or adjusted under 35 U.S.C. 154(b) by 0 days.

(21) Appl. No.: 17/922,828

(22) PCT Filed: Aug. 19, 2021

(86) PCT No.: PCT/CN2021/113574
§ 371 (c)(1),
(2) Date: Nov. 2, 2022

(87) PCT Pub. No.: WO2022/247026
PCT Pub. Date: Dec. 1, 2022

(65) Prior Publication Data
US 2024/0215534 A1    Jul. 4, 2024

(30) Foreign Application Priority Data
May 24, 2021  (CN) .......................... 202121123116.6

(51) Int. Cl.
*A01K 7/04*    (2006.01)
(52) U.S. Cl.
CPC ....................................... *A01K 7/04* (2013.01)
(58) Field of Classification Search
CPC ....................................................... A01K 7/04
USPC ....................................................... 119/72–81
See application file for complete search history.

(56) References Cited

U.S. PATENT DOCUMENTS

| | | | | |
|---|---|---|---|---|
| 968,613 A | * | 8/1910 | Van Ostrand | A01K 7/00 119/900 |
| 1,839,595 A | * | 1/1932 | Ritchie | A01K 7/04 119/73 |
| 2,590,266 A | * | 3/1952 | Nelson | A01K 7/04 119/81 |
| 2,664,070 A | * | 12/1953 | Nelson | A01K 7/04 119/81 |
| 2,836,151 A | * | 5/1958 | Johnson | E03B 9/20 119/81 |

(Continued)

FOREIGN PATENT DOCUMENTS

| | | | |
|---|---|---|---|
| CN | 202680193 U | * | 1/2013 |
| CN | 107006384 A | * | 8/2017 |

(Continued)

OTHER PUBLICATIONS

Merged translation of WO_8500978 (Year: 1985).*

(Continued)

*Primary Examiner* — Morgan T Jordan
(74) *Attorney, Agent, or Firm* — Westbridge IP LLC (57) ABSTRACT

A pet water bowl includes a bowl body provided with a holding tank, a floating device located within the holding tank for preventing a pet's hair from touching water and that floats with a water level, and a purifying device for purifying drinking water in the holding tank. The floating device is located in the holding tank. The floating device rises and falls with a change of a height of the drinking water in the holding tank.

6 Claims, 5 Drawing Sheets

(56) References Cited

U.S. PATENT DOCUMENTS

| | | | | |
|---|---|---|---|---|
| 3,003,465 A * | 4/1962 | Aksila | A01K 39/024 | 119/81 |
| 3,027,872 A * | 4/1962 | Nelson | A01K 7/04 | 119/81 |
| 3,324,834 A * | 6/1967 | McKinstry | A01K 7/027 | 119/81 |
| 4,003,340 A * | 1/1977 | Kuzara | A01K 7/00 | 119/73 |
| 4,100,885 A * | 7/1978 | Kapplinger | A01K 7/027 | 119/73 |
| 4,286,546 A * | 9/1981 | Moore | A01K 7/005 | 119/61.54 |
| 4,394,847 A * | 7/1983 | Langenegger | F16K 7/17 | 137/414 |
| 4,646,687 A * | 3/1987 | Peterson | A01K 7/02 | 119/73 |
| 5,791,287 A * | 8/1998 | Gruber | A01K 7/005 | 119/61.54 |
| 7,487,741 B2 * | 2/2009 | Jordan | A01K 15/025 | 119/61.54 |
| 7,762,211 B1 * | 7/2010 | McDaniel | A01K 7/02 | 119/51.5 |
| 7,849,817 B1 * | 12/2010 | Warganich | A01K 7/02 | 119/77 |
| 11,154,033 B2 | 10/2021 | Houx | | |
| 11,213,008 B2 | 1/2022 | Felker | | |
| 11,617,348 B2 * | 4/2023 | Youn | B01D 29/15 | 119/74 |
| 2004/0118356 A1 | 6/2004 | Krishnamurthy | A01K 7/025 | 119/74 |
| 2009/0266302 A1 * | 10/2009 | Duval | A01K 7/005 | 248/228.7 |
| 2010/0064977 A1 * | 3/2010 | Barker | A01K 7/025 | 119/73 |
| 2012/0111280 A1 * | 5/2012 | Shin | A01K 7/025 | 119/78 |
| 2013/0092090 A1 * | 4/2013 | McCallum | A01K 1/0356 | 119/74 |
| 2014/0251223 A1 * | 9/2014 | Rowe | A01K 7/00 | 119/74 |
| 2015/0189856 A1 * | 7/2015 | Alexander | A01K 39/02 | 119/74 |
| 2021/0051920 A1 | 2/2021 | Xiao et al. | | |
| 2021/0112775 A1 | 4/2021 | Lamb | | |
| 2021/0235663 A1 | 8/2021 | Felker | | |
| 2022/0167585 A1 * | 6/2022 | Wei | A01K 7/02 | |
| 2022/0201973 A1 | 6/2022 | Kim | | |
| 2022/0322635 A1 | 10/2022 | McCormick | | |

FOREIGN PATENT DOCUMENTS

| | | | |
|---|---|---|---|
| CN | 208549612 U | * | 3/2019 |
| CN | 209489295 U | * | 10/2019 |
| CN | 209752261 U | * | 12/2019 |
| CN | 212937316 U | * | 4/2021 |
| CN | 216088253 U | * | 3/2022 |
| CN | 220712467 U | * | 4/2024 |
| WO | WO-8500978 A1 | * | 3/1985 |
| WO | WO-2009030963 A1 * | 3/2009 | A01K 7/025 |

OTHER PUBLICATIONS

Merged translation of WO_2009030963 (Year: 2009).*
Merged translation of CN_202680193 (Year: 2013).*
Merged translation of CN_107006384 (Year: 2017).*
Merged translation of CN_208549612 (Year: 2019).*
Merged translation of CN_209489295 (Year: 2019).*
Merged translation of CN_209752261 (Year: 2019).*
Merged translation of CN_212937316 (Year: 2021).*
Merged translation of CN_216088253 (Year: 2022).*
Merged translation of CN_220712467 (Year: 2024).*
UPSKY "Dog Bowl Dog Water Bowl No Spill Pet Water Bowl No Drip Slow Water Feeder Dog Bowl No. Slip Pet Water Dispenser 35oz Slow Drinking Bowl for Dogs and Cats" https://www.amazon.com/UPSKY-Feeder-No-Slip-Dispenser-Drinking/dp/B07J4PJNZF (Year: 2018).*

* cited by examiner

PET WATER-FEEDING BOWL

TECHNICAL FIELD

This present application relates to the field of a pet article, and particularly to a pet water bowl.

BACKGROUND

With improvement of people's living standards, people enjoy material life while also constantly pursuing spiritual life. More and more people yearn for the relaxation from the nature. Breeding a pet has gradually become a fashion. The pet is a spiritual support for people to meet their intercourse needs, which can bring a lot of joy to people form of emotional support for people, fulfilling their need for companionship and bringing them a lot of joy. A pet drinking device is used to timely replenish water to the pet's body. In the prior art, many types of pet water devices are provided. Quality of water in the pet water device is prone to being contaminated by hair and external impurities after prolonged use. The pet is prone to illness after drinking the water, which is not good for health of the pet.

Therefore, it is necessary to provide a pet water bowl to solve the above technical problems.

SUMMARY

This present application provides a pet water bowl, which solves the problems of a pet water device. Many pet water feeding devices are provided. Quality of water in the pet water device is prone to being contaminated by hair and external impurities after prolonged use. The pet is prone to illness after drinking the water, which is not good for health of the pet.

To solve the above technical problem, the present application has the following technical solution: a pet water bowl includes a bowl body provided with a holding tank, a floating device located within the holding tank for preventing pet hair from touching water and that floats with a water level, and a purifying device for purifying drinking water in the holding tank.

In the present application, the floating device includes an upper housing and a lower housing. The lower housing is provided with a first groove and a limiting frame. The first groove and the limiting frame form a chamber for placing the purifying device, and the first groove is located on a side of the lower housing away from the upper housing:

The purifying device is an activated-carbon filter.

In the present application, an inner wall of the first groove is provided with a first limiting surface. The limiting frame is provided with a second limiting surface, and the first limiting surface and the second limiting surface are fitted.

In the present application, the first groove and the limiting frame are both provided with a plurality of first water outlets, and the first water outlets of the first groove are opposite to the first water outlets of the limiting frame.

In the present application, a side of the lower housing adjacent to the upper housing is provided with a first limiting ring. The first limiting ring is located on a peripheral side of an outer wall of the first groove, and the first limiting ring and the first groove form a limiting groove.

A side of the upper housing adjacent to the lower housing is provided with a second limiting ring, and the second limiting ring is located in the limiting groove.

In the present application, the lower housing is further provided with an L-shaped first water inlet. The first water inlet is located in the first groove, and the first water outlet of the first groove is located on a peripheral side of the first water inlet:

The limiting frame is provided with an L-shaped second water inlet, and the second water inlet is located within the first water inlet.

In the present application, the inner wall of the first groove and an outer wall of the first water inlet are both provided with a plurality of limiting protrusions. An outer peripheral side of the limiting frame and an inner wall of the second water inlet are both provided with a plurality of fixing grooves, and the fixing grooves are opposite to the limiting protrusions.

In the present application, the upper housing is provided with a concave-arc surface that is concave toward the lower housing.

In the present application, a plurality of second water outlets are arranged in the concave-arc surface.

In the present application, the pet water bowl further includes a check ring for limiting the floating device. The check ring is located at an inner side of an opening of the housing groove.

Compared with the prior art, the present application has the following beneficial effects: for the pet water bowl of the present application, the bowl body is provided with the holding tank for holding the drinking water. The floating device is located in the holding tank. The floating device rises and falls with a change of a height of the drinking water in the holding tank. The drinking water is purified via the purifying device. When the pet drinks the purified drinking water, the purified drinking water can reduce probability of the pet falling ill, and the floating device further prevents external bacteria caused by the water touched by the pet's hair, which is beneficial to health of the pet.

BRIEF DESCRIPTION OF THE DRAWINGS

In order to more clearly illustrate the technical solutions in the embodiments of the present application or in the prior art, the drawings that need to be used in the embodiments will be briefly described below. The drawings in the following description are only the corresponding drawings of some embodiments of the present application.

DETAILED DESCRIPTION OF THE EMBODIMENTS

The following clearly and completely describe the technical solutions in embodiments of the present application in conjunction with the accompanying drawings in the embodiments of the present application. Obviously, the described embodiments are only a part of the embodiments of the present application, rather than all embodiments. Based on the embodiments of the present application, all other embodiments obtained by those skilled in the art without creative labor shall fall within the protection scope of the present application.

Many pet water feeding devices are provided in the prior art. Quality of water in the pet water device is prone to being contaminated by hair and external impurities after prolonged use. The pet is prone to illness after drinking the water, which is not good for health of the pet A preferred embodiment of a pet water bowl provided by the present application that solves the above technical problems is provided below.

Figure 1:
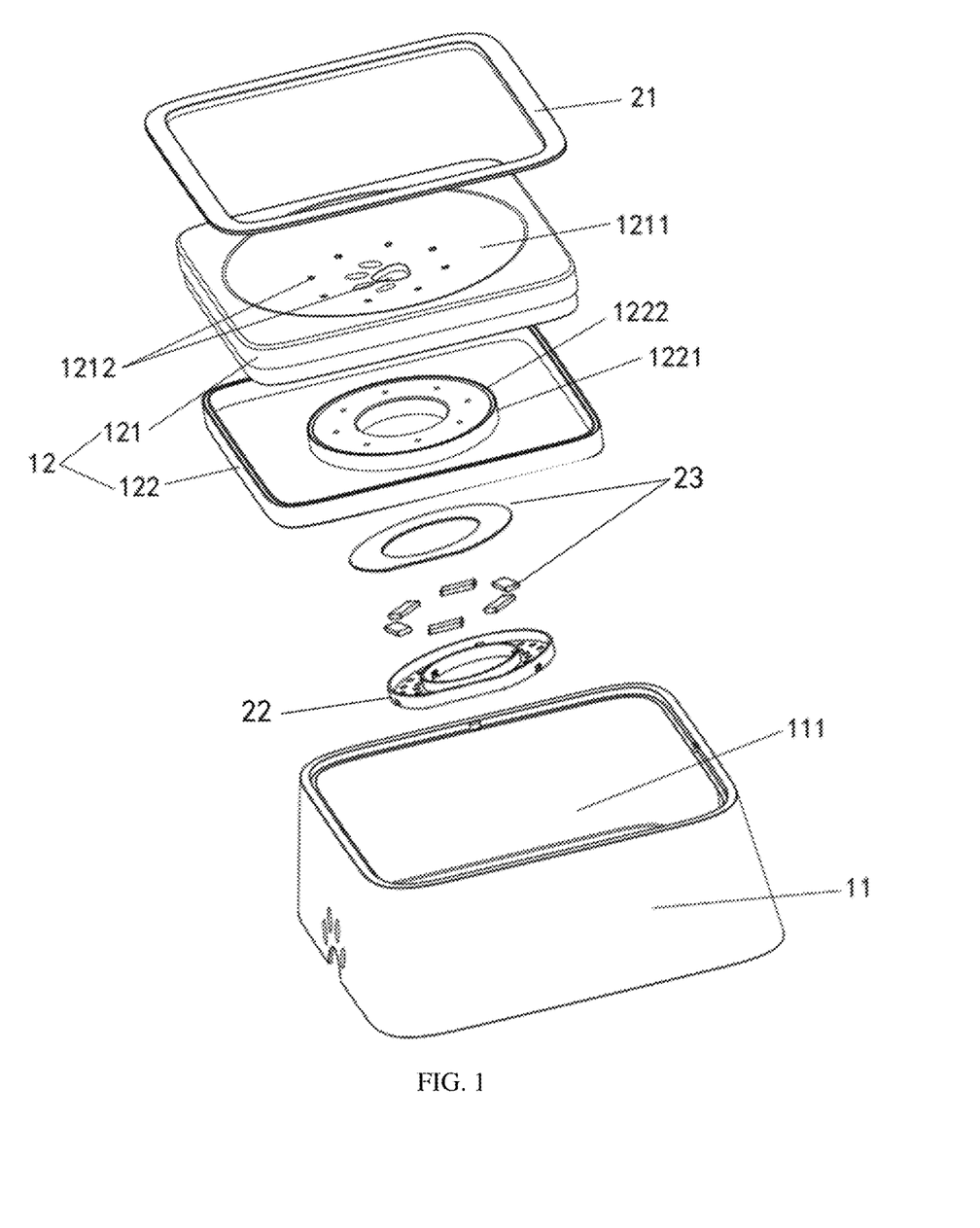
FIG. 1 is an exploded view of a pet water bowl of the present application.
Figure 2:
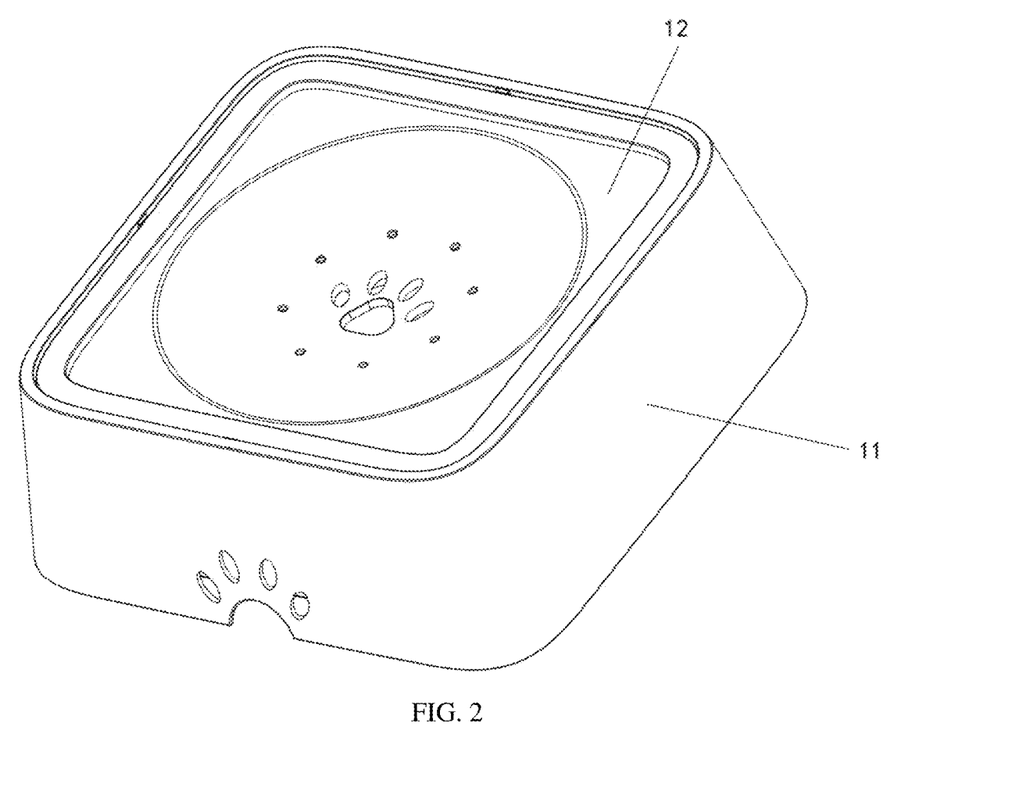
FIG. 2 is a perspective view of a pet water bowl of the present application.
Figure 3:
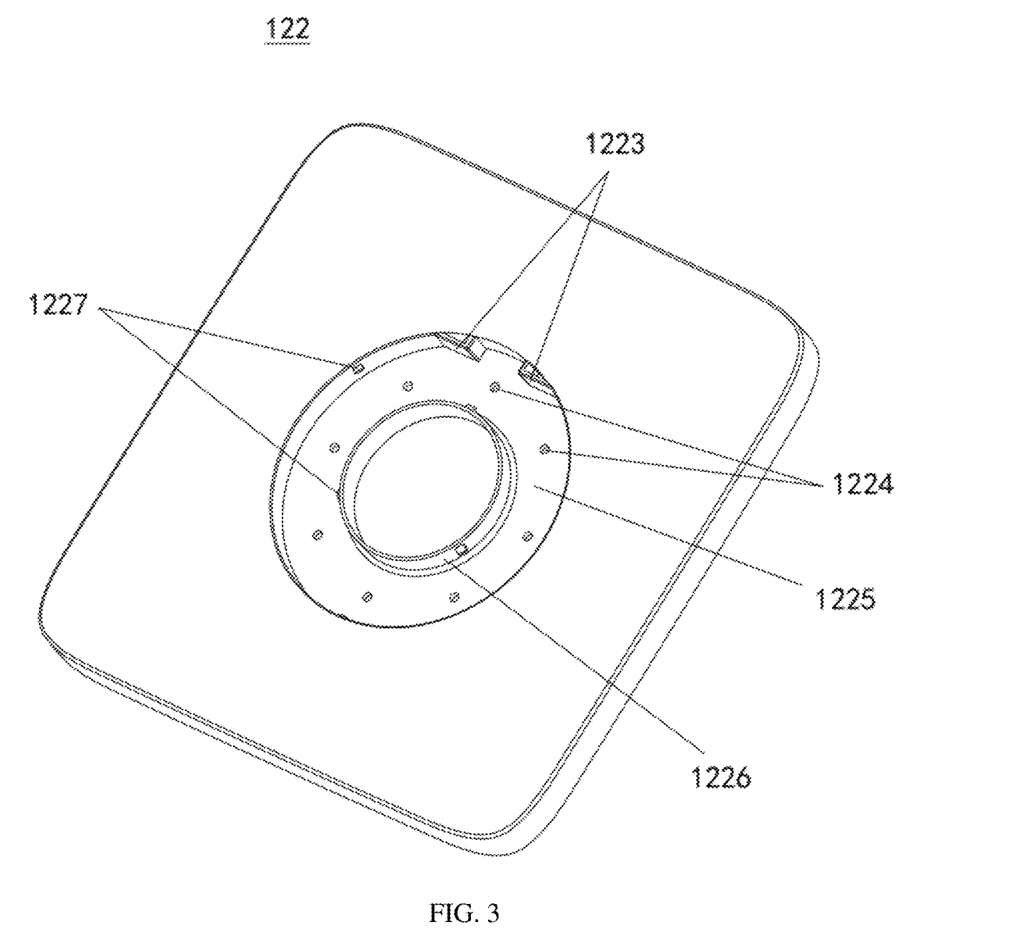
FIG. 3 is a perspective view of an upper housing of a pet water bowl of the present application.

Referring to FIGS. 1, 2 and 3, FIG. 1 is an exploded view of a pet water bowl of the present application. FIG. 2 is a perspective view of the pet water bowl of the present application. FIG. 3 is a perspective view of an upper housing of the pet water bowl of the present application.

In the figures, units of similar structures are represented by the same reference signs.

Terms "first" and "second" in the present application are for illustrative purposes only and cannot be construed as indicating or implying relative importance and limitation of order.

The pet water bowl provided by the present application includes a bowl body 11 provided with a holding tank 111, a floating device 12 connected within the holding tank 111 for preventing pet hair from touching water and that floats with a water level, and a purifying device 23 for purifying drinking water in the holding tank 111. The holding tank 111 of the bowl body 11 is configured to hold the drinking water of a pet. The floating device 12 is located in the holding tank 111. The floating device 12 is located above the water level. The floating device 12 rises and falls with the water level. On the one hand, the floating device prevents the pet from dirtying the water bowl while the pet drinks the water, and on the other hand, the floating device prevents the pet's hair from getting wet. The purifying device 23 is configured to purify the drinking water in the holding tank, and prevent the drinking water from breeding bacteria due to external impurities or too long storage. Therefore, the pet can drink safe drinking water to reduce probability of the pet falling ill, and is beneficial for health of the pet.

The floating device 12 includes an upper housing 121 and a lower housing 122. The lower housing 121 is provided with a first groove 1225 and a limiting frame 22. The first groove 1225 and the limiting frame 22 form a chamber for placing the purifying device 23. The first groove 1225 is located on a side of the lower housing 122 away from the upper housing 121 so that a bottom of the lower housing 122 is located on the same horizontal plane as the holding tank 111. On the one hand, the lower housing 122 is prevented from being skewed when too less drinking water of the holding tank 111 is provided so that the pet is inconvenient to drink water. On the other hand, the purifying device 23 can uniformly disinfect the drinking water in the holding tank 111. The purifying device 23 is an activated-carbon filter or an ion-exchange plastic resin. The chamber is configured to fix the activated-carbon filter to prevent the activated-carbon filter from moving in the holding tank.

Figure 4:
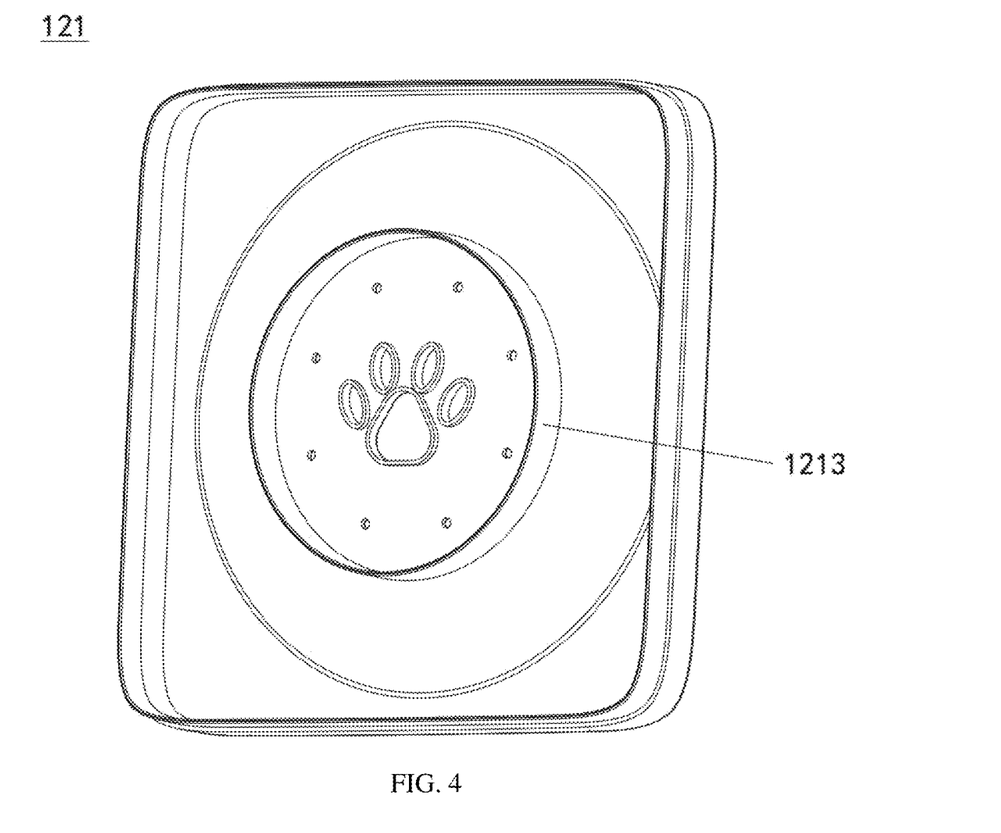
FIG. 4 is a perspective view of a lower housing of a pet water bowl of the present application.
Figure 5:
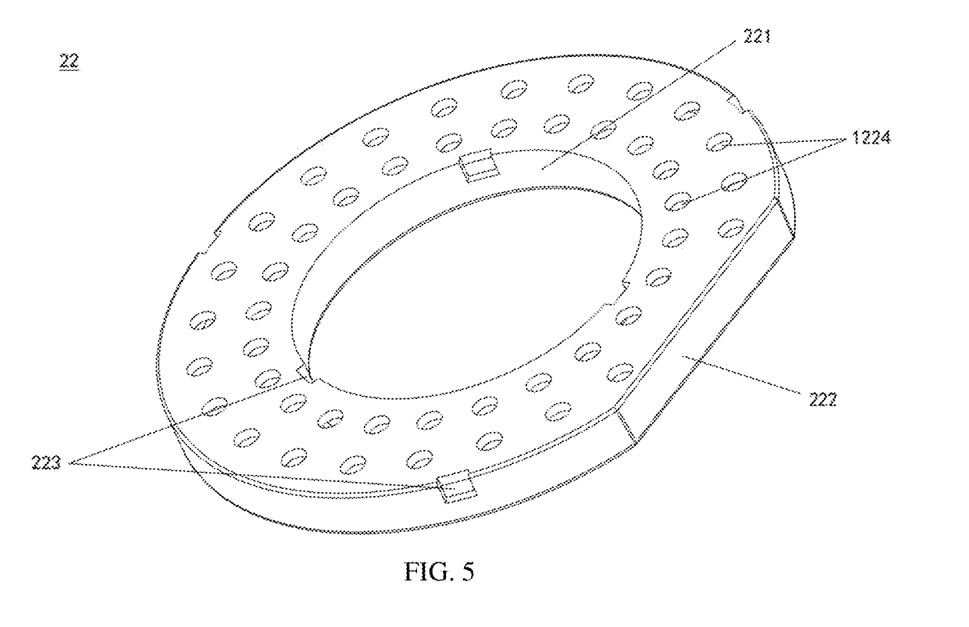
FIG. 5 is a perspective view of a limiting frame of a pet water bowl of the present application.

Referring to FIGS. 4 and 5, FIG. 4 is a perspective view of the lower housing of the pet water bowl of the present application. FIG. 5 is a perspective view of the limiting frame 22 of the pet water bowl of the present application. Am inner wall of the first groove 1225 is provided with a first limiting surface 1223. The limiting frame 22 is provided with a second limiting surface 222. The first limiting surface 1223 and the second limiting surface 222 are located opposite each other. The first limiting surface 1223 and the second limiting surface 222 are fitted. The second limiting surface 222 of the limiting frame 22 is limited by the first limiting surface 1223 of the first groove 1225 to prevent the limiting frame 22 from being rotated or shaken when the limiting frame is connected within the first groove 1225.

The first groove 1225 and the limiting frame 22 are both provided with a plurality of first water outlets 1224. The first water outlets 1224 of the first groove 1225 are opposite to the first water outlets 1224 of the limiting frame 22. The purifying device 23 is located between the first water outlets 1224 of the first groove 1225 and the first water outlets 1224 of the limiting frame 22. The disinfected drinking water enters or exits from the first water outlets 1224 to facilitate the purifying device 23 to disinfect the drinking water.

A side of the lower housing 122 adjacent to the upper housing 121 is provided with a first limiting ring 1221. The first limiting ring 1221 is located on a peripheral side of an outer wall of the first groove 1225. The first limiting ring 1221 and the first groove 1225 form a limiting groove. A side of the upper housing 121 adjacent to the lower housing 122 is provided with the second limiting ring 1213. The second limiting ring 1213 is located in the limiting groove. The second limiting ring 1213 of the upper housing 121 is connected in the limiting groove. The limiting groove is configured to limit the second limiting ring 1213. When the drinking water level is lowered, the upper housing 121 and the lower housing 122 are prevented from being biased and snap-fastened in the holding tank 111 when the upper housing 121 is separated from the lower housing 122, which causes a problem that the pet cannot drink the water.

The lower housing 122 is further provided with an L-shaped first water inlet 1226. The first water inlet 1226 is located in the first groove 1225. The first water outlet 1224 of the first groove 1225 is located on a peripheral side of the first water inlet 1226. The limiting frame 22 is provided with an L-shaped second water inlet 221. The second water inlet 221 is located in the first water inlet 1226. The second water inlet 221 is configured to limit the first water inlet 1226 so that the first groove 1225 conveniently limits the limiting frame 22, and the limiting frame 22 is further prevented from being swung in the first groove 1225.

The inner wall of the first groove 1225 and the outer wall of the first water inlet 1226 are both provided with a plurality of limiting protrusions 1227. An outer peripheral side of the limiting frame 22 and an inner wall of the second water inlet 221 are both provided with a plurality of fixing grooves 223. The fixing grooves 223 are opposite to the limit protrusions 1227. The limiting protrusion 1227 of the first groove 1225 is snap-fastened within the fixing groove 223 of the limiting frame 22. The limit protrusion 1227 of the first water inlet 1226 is snap-fastened within the fixing groove 223 of the second water inlet 221. The fixing groove 223 is configured to snap-fasten the limiting protrusion 1227, and fix the limiting frame 22 within the first groove 1225 to prevent the limiting frame 22 from being separated from the first groove 1225. On the one hand, the purifying device 23 is fixed within the chamber, and on the other hand, the purifying device 23 is limited within the chamber via the limit protrusion 1227. This facilitates the removal of the limiting frame 22 and replacement of the purifying device 23 so that the pet water bowl can be recycled, thereby saving costs.

In this embodiment, the purifying device 23 is an activated-carbon filter or an ion-exchange plastic resin, and can also be an infrared purifying member, an ultraviolet purifying member, or the like, but is not limited to using only the activated-carbon filter, the ion-exchange plastic resin, the infrared purifying member, and the ultraviolet purifying member to perform disinfection.

The upper housing 121 is provided with a concave-arc surface 1211 that is concave toward the lower housing 122.

A plurality of second water outlets 1212 are provided in the concave-arc surface 1211. The concave-arc surface 1211 is located below a top surface of the first upper housing 121. The concave-arc surface 1211 is located below the drinking water. The second water outlet 1212 is configured to facilitate flow of the drinking water from the lower housing 122 into the concave-arc surface 1211, which, on the one hand, facilitates the pet to drink the water, and on the other hand, facilitates the pet's hair not to be easily wet when the pet's hair is too long, so as to keep the pet clean.

The pet water bowl also includes a check ring 21 for limiting the floating device 12. The check ring 21 is located inside an opening of the holding tank 111. The check ring is configured to block the floating device 12, which prevents the floating device from being separated from the bowl body 11 when too much drinking water is provided in the holding tank 111.

Working Principle:

The pet water bowl includes the bowl body 11, the floating device 12 connected within the bowl body 11, and the purifying device 23 connected within the floating device 12. The bowl body 11 is provided with a holding tank 111 for containing the drinking water for the pet. The floating device 12 includes the upper housing 121 and the lower housing 122. The upper housing 121 includes a concave-arc surface 1211 and a second water outlet 1212. The second water outlet 1212 is located within the concave-arc surface 1211. The second water outlet 1212 is configured to discharge the drinking water within the holding tank 111 for the pet to drink. The lower housing 122 includes a first groove 1225 and a limiting frame 22. The first groove 1225 and the limiting frame 22 form a chamber. The purifying device 23 is located in the chamber. The chamber is configured to fix the purifying device 23.

The first groove 1225 and the limiting frame 22 both include the first water outlets 1224 that are oppositely arranged. The first water outlet 1224 is located on both sides of the chamber to facilitate disinfection of the drinking water by the purifying device 23. The limiting frame 22 is provided with the L-shaped second water inlet 221. The first groove 1225 is provided with the I-shaped first water inlet 1226. The second water inlet 221 is located within the first water inlet 1226. The second water inlet 221 is configured to limit the first water inlet 1226. The first groove 1225 is also provided with a first limiting surface 1223. The limiting frame 22 is provided with a second limiting surface 222. The second limiting surface 222 and the first limiting surface 1223 are fitted. The first limiting surface 1223 is configured to limit the limiting frame 22 to prevent the limiting frame 22 from being swung in the first groove 1225. Peripheral sides of the second water inlet 221 and the limiting frame 22 are provided with the plurality of fixing grooves 223. The first groove 1225 and the second water inlet 221 are both provided with the plurality of limit protrusions 1227. The limiting protrusions 1227 are snap-fastened in the fixing groove 223, so as to stably limit the purifying device 23 in the chamber. Therefore, the purifying device 23 can stably disinfect the drinking water in the holding tank 111, which prevents the pet from drinking the unclean drinking water and falling ill, etc.

The pet water bowl of the preferred embodiment is provided with the holding tank for holding the drinking water via the bowl body. The floating device is located in the holding tank. The floating device rises and falls with a change of a height of the drinking water in the holding tank. The floating device includes the upper housing and the lower housing. The lower housing is provided with the first groove and the limiting frame. The limiting frame and the second groove form the chamber. The purifying device 23 is located in the chamber. The purifying device 23 is limited in the first groove via the limiting frame, which prevents the purifying device 23 from being separated from the lower housing. Since the purifying device 23 is located below the floating device, the purifying device 23 conveniently disinfies the drinking water in the holding tank, and eliminates bacteria of the drinking water, which reduce probability of the pet falling ill, and is beneficial to health of the pet.

In summary, although the present application has been disclosed in the above preferred embodiments, the above preferred embodiments are not intended to limit the present application. Those skilled in the art can make various changes and modifications without departing from the spirit and scope of the present application. Therefore, the scope of protection of the present application is subject to the scope defined in the claims.

The invention claimed is:

1. A pet water bowl, comprising:
a bowl body provided with a holding tank,
a floating device located within the holding tank for preventing a pet's hair from touching water and that floats with a water level,
a purifying device for purifying drinking water in the holding tank, and
a check ring for limiting the floating device, the check ring being located at an inner side of an opening of the holding tank,
wherein the floating device comprises an upper housing and a lower housing, the lower housing is provided with a first groove and a limiting frame, the first groove and the limiting frame form a chamber for placing the purifying device, and the first groove is located on a side of the lower housing away from the upper housing;
the purifying device is an activated carbon filter or/and an ion-exchange plastic resin;
the first groove and the limiting frame are both provided with a plurality of first water outlets, and the first groove is opposite to the limiting frame;
the lower housing is further provided with an L-shaped first water inlet, the first water inlet is located in the first groove, and the first water outlet of the first groove is located on a peripheral side of the first water inlet; and
the limiting frame is provided with an L-shaped second water inlet, and the second water inlet is located within the first water inlet.

2. The pet water bowl according to claim 1, wherein an inner wall of the first groove is provided with a first limiting surface, the limiting frame is provided with a second limiting surface, and the first limiting surface and the second limiting surface are fitted.

3. The pet water bowl according to claim 1, wherein a side of the lower housing adjacent to the upper housing is provided with a first limiting ring, the first limiting ring is located on a peripheral side of an outer wall of the first groove, and the first limiting ring and the first groove form a limiting groove;
a side of the upper housing adjacent to the lower housing is provided with a second limiting ring, and the second limiting ring is located in the limiting groove.

4. The pet water according to claim 1, wherein the inner wall of the first groove and an outer wall of the first water inlet are both provided with a plurality of limiting protrusions, an outer peripheral side of the limiting frame and an inner wall of the second water inlet are both provided with a plurality of fixing grooves, and the fixing grooves are opposite to the limiting protrusions.

5. The pet water bowl according to claim 1, wherein the upper housing is provided with a concave-arc surface that is concave toward the lower housing.

6. The pet water bowl according to claim 5, wherein a plurality of second water outlets are arranged in the concave-arc surface.

* * * * *